United States Patent [19]
Funatsu et al.

[11] Patent Number: 5,713,815
[45] Date of Patent: Feb. 3, 1998

[54] CONTROL APPARATUS FOR CONTINUOUSLY VARIABLE VEHICULAR TRANSMISSION

[75] Inventors: Kouichi Funatsu; Hideo Koyama; Daihei Teshima, all of Saitama-ken, Japan

[73] Assignee: Honda Giken Kogyo Kabushiki Kaisha, Tokyo, Japan

[21] Appl. No.: 677,454

[22] Filed: Jul. 2, 1996

[30] Foreign Application Priority Data

Jul. 11, 1995 [JP] Japan ................ 7-175166

[51] Int. Cl.$^6$ ........................... F16H 61/00
[52] U.S. Cl. ............... 477/46; 477/48; 477/49; 477/98
[58] Field of Search ............... 477/37, 44, 46, 477/48, 49, 98; 474/28

[56] References Cited

U.S. PATENT DOCUMENTS

| | | |
|---|---|---|
| 4,653,006 | 3/1987 | Osanai et al. |
| 4,653,007 | 3/1987 | Osanai et al. |
| 5,050,455 | 9/1991 | Yamashita et al. ........... 477/46 |
| 5,600,557 | 2/1997 | Ogawa ........... 477/37 X |
| 5,612,873 | 3/1997 | Ogawa ........... 477/49 X |

FOREIGN PATENT DOCUMENTS

62-286847  12/1987  Japan.

*Primary Examiner*—Khoi Q. Ta
*Attorney, Agent, or Firm*—Armstrong, Westerman, Hattori, McLeland & Naughton

[57] ABSTRACT

By a controller which controls a speed-change control valve for switching a hydraulic pressure to be supplied to each of cylinder chambers of each of pulleys of a continuously variable vehicular transmission, the speed reduction ratio is controlled such that the engine revolution speed becomes a target revolution speed which is set depending on the running conditions of a vehicle. When an accumulated time of high-speed operation at which Ne becomes higher than a predetermined first set revolution speed exceeds a first set time, an upper limit value of Ne or the target revolution speed is corrected to decrease. Further, when the duration time of a low-speed revolution below a predetermined second set revolution speed which is smaller than the first set revolution speed exceeds a second set time, the upper limit value of Ne is corrected to increase or the correction to decrease the target revolution speed is stopped.

10 Claims, 10 Drawing Sheets

CONTROL APPARATUS FOR CONTINUOUSLY VARIABLE VEHICULAR TRANSMISSION

BACKGROUND OF THE INVENTION

1. Field of the Invention

The present invention relates to a control apparatus for a continuously variable vehicular transmission which varies the speed reduction ratio depending on the running conditions of the vehicle.

2. Description of the Related Art

There is conventionally known a continuously variable vehicular transmission using a V-belt mechanism, comprising a pair of pulleys whose pulley width is made variable, and a metallic V-belt which is wound around both the pulleys.

This kind of continuously variable transmission is arranged to set a target revolution speed of an engine of the vehicle based on a vehicle speed and an engine load, and to variably control the speed reduction ratio such that the revolution speed of the engine becomes the target revolution speed.

When the engine is operated at a high output for a long period of time, the temperature of a working fluid (or hydraulic oil) of the transmission increases. This causes the deterioration of the operating fluid, a decrease in the lubricating performance, and a decrease in the power transmission capacity.

In order to solve this kind of disadvantages, there is known the following art as disclosed in Japanese Published Unexamined Patent Application No. 286847/1987. Namely, the temperature of the hydraulic oil in the transmission is detected and, when its temperature exceeds a predetermined set temperature, the speed reduction ratio is lowered. The revolution speed of the engine is thereby lowered to decrease the amount of heat generation.

In the above-described prior art, there are the following disadvantages. Namely, temperature sensors for detecting the hydraulic oil temperature become necessary, resulting in a higher cost. Further, in case the temperature sensors fail, the speed reduction ratio will no longer be lowered even if the hydraulic oil temperature increases. As a result, there is a possibility of an abnormal rise in the hydraulic oil temperature.

SUMMARY OF THE INVENTION

In view of the above-described disadvantages, the present invention has an object of providing an inexpensive control apparatus for a continuously variable vehicular transmission which prevents an abnormal rise in the hydraulic oil temperature without using oil temperature sensors.

In order to attain the above and other objects, according to one aspect of the present invention, there is provided a control apparatus for a continuously variable vehicular transmission for continuously varying a speed reduction ratio depending on a running condition of a vehicle, having: means for setting a target revolution speed of an engine based on a vehicle speed and an engine load; and means for variably controlling the transmission speed ratio such that the revolution speed of the engine becomes the target revolution speed; wherein the improvement comprising: upper limit setting means for setting the target revolution speed to an upper limit value when the target revolution speed exceeds the upper limit value; first time measuring means for measuring an accumulated time when the revolution speed of the engine exceeds a first set revolution speed which is lower than the upper limit value; and first correction means for correcting to decrease the upper limit value when the accumulated time has exceeded a first set time.

If the time of high revolution speed at which the revolution speed of the engine is above the first set revolution speed exceeds the first set time, the hydraulic oil temperature in the transmission will be on the increasing hand. If the revolution speed of the engine is brought up to a normal upper limit value in this condition, the hydraulic oil temperature excessively increases.

However, according to the above arrangement, once the time of high revolution speed of the engine exceeds the first set time, the upper limit value is corrected to decrease. Therefore, the revolution speed of the engine will no longer be brought up to the normal upper limit value, thereby preventing the hydraulic oil temperature from abnormally increasing.

Further, when the revolution speed of the engine fluctuates in the neighborhood of the first set revolution speed, the hydraulic oil temperature will be on the increasing hand even if the duration time of the high-speed revolution above the first set revolution speed is short. As a solution, according to the present invention, it is so arranged that the upper limit value is corrected to decrease when the accumulated time of high-speed revolution exceeds the first set time, thereby surely preventing the abnormal increase in the hydraulic oil temperature.

By the way, if the upper limit value is kept maintained at a value corrected to decrease, the increase in the revolution speed of the engine will unnecessarily be restricted even when the hydraulic oil temperature has sufficiently lowered, resulting in deteriorated drivability. As a solution, it is preferable to provide second time measuring means for measuring between a time when the revolution speed of the engine lowers below a second set revolution speed which is smaller than the first set revolution speed and a time when it exceeds once again the second set revolution speed; and second correction means for correcting to increase the upper limit value when the time measured by the second time measuring means exceeds a second set time. In other words, when the time of low revolution speed at which the revolution speed of the engine is below the second set revolution speed exceeds the second set time, the hydraulic oil temperature must have lowered sufficiently and there will be no problem even if the upper limit value corrected to decrease is corrected to increase. When the revolution speed of the engine fluctuates in the neighborhood of the second set revolution speed, there is a possibility that the hydraulic oil temperature does not sufficiently lower even if the accumulated time of low revolution speed below the second set revolution speed becomes long provided the duration time of the low-speed revolution is short. Therefore, it is so arranged that the upper limit value is corrected to increase only when the revolution speed of the engine lowers below the second set revolution speed and then exceeds once again the second set revolution speed, in other words, only when the duration time of the low-speed revolution exceeds the second set time.

Further, when the accumulated time of high-speed revolution exceeds the first set time, the upper limit value will be continuously reduced at the time of high-speed revolution. However, if the upper limit value is lowered excessively, the drivability is deteriorated. It is thus necessary to set a minimum value of the upper limit value. In this case, if the ambient temperature is high, the thermal load becomes high and the hydraulic oil temperature is likely to rise. It is therefore preferable to variably set the minimum value depending on the ambient temperature.

According to the above-described first aspect of the present invention, an arrangement has been made to correct the upper limit value of the revolution speed of the engine. It is also possible to prevent the abnormal increase in the hydraulic oil temperature by correcting that target revolution speed of the engine which is set based on the vehicle speed and the engine load. Therefore, according to another aspect of the present invention, there are provided first time measuring means for measuring an accumulated time when the revolution speed of the engine exceeds a first set revolution speed, and correction means for correcting to decrease the target revolution speed when the accumulated time exceeds a first set time.

In this case, it is preferable to stop the correction by the above-described means for correction when the duration time of low-speed revolution at which the revolution speed of the engine is below a second set revolution speed exceeds a second set time. It is also preferable to variably set the amount of correction by the above-described correction means depending on the target revolution speed, so that the target revolution speed is largely corrected to decrease when the target revolution speed becomes larger.

In both the above-described first and second aspects of the present invention, it is preferable to variably set at least one of the first set time, the second set time, the first set revolution speed and the second set revolution speed depending on the ambient temperature so that the increase in the hydraulic oil temperature at a high ambient temperature can be surely prevented.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
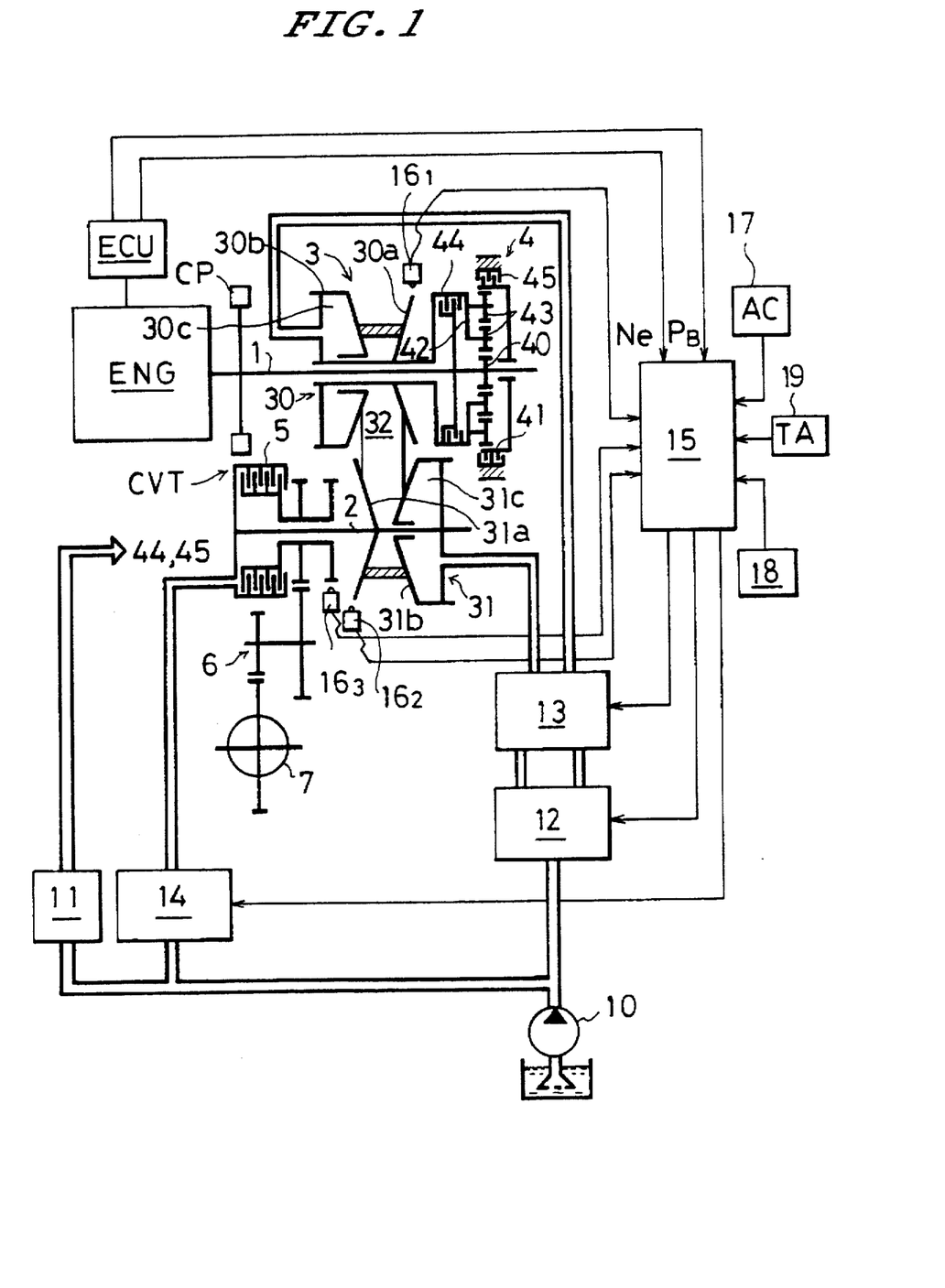
FIG. 1 is a schematic diagram showing the mechanical arrangement and the control system of a continuously variable transmission in which the control apparatus of the present invention is used.

FIG. 1 shows a belt-type continuously (or infinitely or steplessly) variable transmission CVT, as a power transmission device, which transmits a driving force of an engine of a vehicle such as a motor vehicle to the driving wheels thereof. The transmission comprises: a V-belt mechanism 3 which is disposed between an input shaft 1 to be connected to the engine ENG via a coupling mechanism CP and an output shaft 2; a switching mechanism 4 for switching between forward and reverse (or rearward) running which is disposed on an input side of the V-belt mechanism 3; and a start clutch 5 which is disposed on an output side of the V-belt mechanism 3.

The V-belt mechanism 3 is made up of: a drive pulley 30 which is disposed on the input shaft 1; a driven pulley 31 which is disposed on the output shaft 2; and a metallic V-belt 32 which is wound around both the pulleys 30, 31. Each of the pulleys 30, 31 is made up of: a fixed sheave 30a, 31a; a movable sheave 30b, 31b which is axially movable relative to the fixed sheave 30a, 31a; and a cylinder chamber 30c, 31c which urges or pushes the movable sheave 30b, 31b towards the fixed sheave 30a, 31a. Continuously variable transmission is performed in the following manner. Namely, by adequately controlling the pressure of oil supply to the cylinder chambers 30c, 31c of both the pulleys 30, 31 (i.e., the pulley control hydraulic pressure), a suitable pulley side-pressure which causes the V-belt 32 not to slip is generated, and also the pulley width of both the pulleys 30, 31 is varied, thereby changing the diameter of winding the V-belt 32 on the pulleys 30, 31.

The switching mechanism 4 for switching between forward and reverse running is constituted by a planetary gear mechanism which is made up of: a sun gear 40 connected to the input shaft 1; a ring gear 41; a carrier 42 which is connected to the drive pulley 30; planetary gears 43 which are rotatably supported on the carrier 42 for engagement with the sun gear 40 and the ring gear 41; a forward clutch (i.e., a clutch for forward running) 44 which can connect the input shaft 1 and the carrier 42; and a reverse brake (i.e., a brake for reverse running) 45 which can fix the ring gear 41. When the forward clutch 44 is engaged, the carrier 42 rotates together with the input shaft 1, and the drive pulley 30 is driven in the same direction as the input shaft 1 (i.e., in the forward direction). When the reverse brake 45 is engaged, the carrier 42 is rotated in a direction opposite to that of the sun gear 40, and the drive pulley 30 is driven in the direction opposite to that of the input shaft 1 (i.e., in the reverse direction). When both the forward running clutch 44 and the reverse brake 45 are disengaged, the power transmission via the switching mechanism 4 for switching between forward and reverse running is cut off.

The start clutch 5 is connected to the output shaft 2. When the start clutch 5 is engaged, the output of the engine 3 whose speed has been changed by the V-belt mechanism 3 is transmitted to a differential mechanism 7 via a gear train 6 on the output side of the start clutch 5, and the driving force is thus transmitted from the differential mechanism 7 to the right and left driving wheels (not illustrated) of the vehicle. When the start clutch 5 is disengaged, the transmission of power cannot be effected, and the continuously variable transmission CVT becomes a neutral condition.

In the hydraulic control circuit for the continuously variable transmission CVT, there are provided: a hydraulic pump 10 to be driven by the engine ENG; a manual valve 11 which controls the supply and discharge of hydraulic oil to and from the forward clutch 44 and the reverse brake 45 and which is switch-operated in interlocking with a shift lever (not illustrated); a pulley side-pressure control valve 12 which generates the pulley control hydraulic pressure to be supplied to cylinder chambers 30c, 31c of the drive pulley 30 and the driven pulley 31, respectively; a speed-change control valve 13 which controls the supply of pulley control pressure to each of the cylinder chambers 30c, 31c; and a clutch control valve 14 which controls the hydraulic fluid pressure to be supplied to the start clutch 5.

The pulley side-pressure control valve 12, the speed-change control valve 13, and the clutch control valve 14 are controlled by a controller 15. To the controller 15 the following signals are inputted, namely: signals from an engine control unit ECU showing the revolution speed Ne and a negative suction pressure PB of the engine ENG; signals from first through third rotation sensors $16_1$, $16_2$, $16_3$ showing the revolution speed of the drive pulley 30, the revolution speed of the driven pulley 31, and the revolution speed of the output side of the start clutch 5 as a vehicle speed, respectively; a signal from an air conditioner operation detector 17 which detects the operation of an air conditioner AC; a signal from a shift range detector 18 which detects the shift range position based on the position of a shift lever or of the manual valve 11; and a signal from a temperature sensor 19 which detects the ambient temperature TA.

Figure 2:
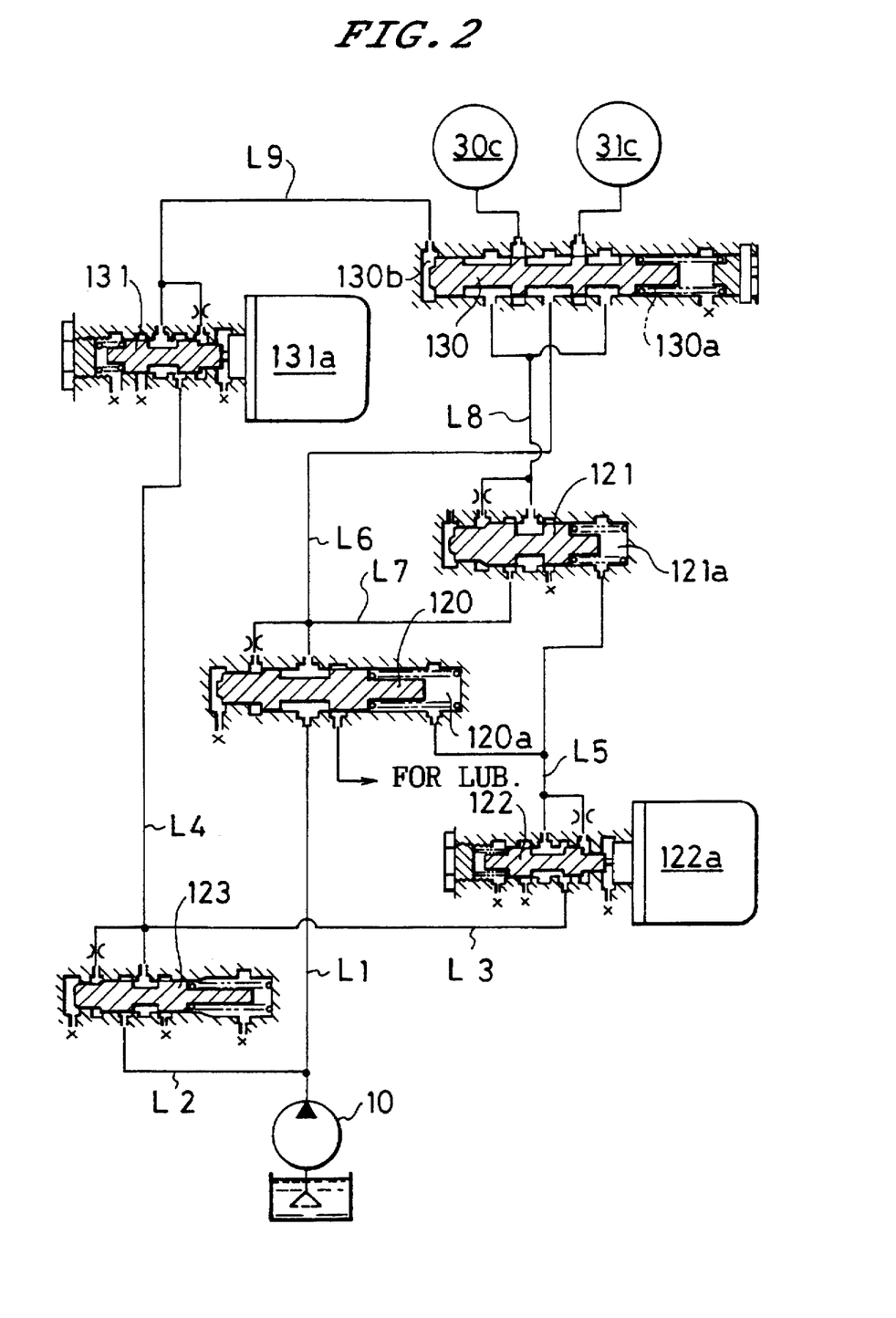
FIG. 2 is a diagram showing a concrete arrangement of a pulley side-pressure control valve and a transmission control valve.

Details of the pulley side-pressure control valve 12 and the speed-change control valve 13 are as shown in FIG. 2. The pulley side-pressure control valve 12 comprises a high-pressure regulator valve 120, a low-pressure regulator valve 121, and a first pressure adjusting valve 122 made up of a linear solenoid valve. The speed-change control valve 13 comprises a shift valve 130, and a second pressure adjusting valve 131 made up of a linear solenoid valve. In the Figure the ports marked with a mark "x" denote drain ports.

The hydraulic oil to be supplied from the hydraulic pump 10 is supplied to the high-pressure regulator valve 120 via an oil passage L1 and is also supplied to a reducing valve 123 via an oil passage L2. The reducing valve 123 is to output a constant hydraulic pressure which is lower than the supplied pressure from the hydraulic pump 10. The constant hydraulic pressure to be outputted from the reducing valve 123 is supplied to each of the pressure adjusting valves 122, 131 via each of the oil passages L3, L4, respectively. Each of the pressure adjusting valves 122, 131 is so arranged that the hydraulic pressure corresponding to the exciting electric current value of each of solenoids 122a, 131a thereof is outputted. The output hydraulic pressure of each of the pressure adjusting valves 122, 131 is variably controlled by controlling with the controller 15 the exciting electric current value to each of the solenoids 122a, 131a.

Figure 3:
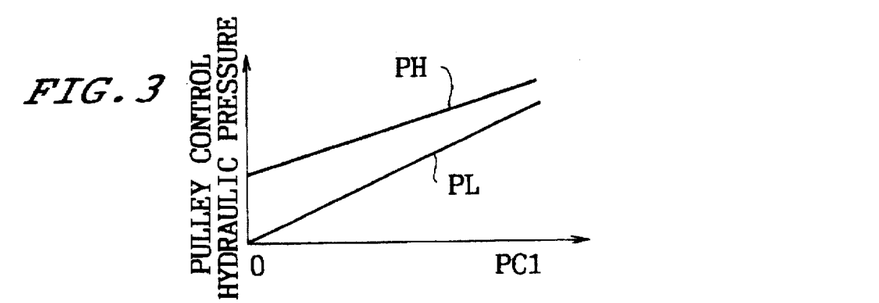
FIG. 3 is a graph showing the change characteristics of the pulley control pressures PH and PL.

The high-pressure regulator valve 120 is arranged to output a relatively high pulley control hydraulic pressure PH which is proportional to that output hydraulic pressure PC1 of the first pressure adjusting valve 122 which is inputted to a right end oil chamber 120a of the high-pressure regulator valve 120 via an oil passage L5. This pulley control hydraulic pressure PH is supplied to the shift valve 130 via an oil passage L6 and is also supplied to the low-pressure regulator valve 121 via an oil passage L7. The low-pressure regulator valve 121 is arranged to output a relatively low pulley control hydraulic pressure PL which is proportional to that output hydraulic pressure PC1 of the first pressure adjusting valve 122 which is inputted to a right end oil chamber 121a via the oil passage L5. This pulley control hydraulic pressure PL is supplied to the shift valve 130 via an oil passage L8. The relationship between the output hydraulic pressure PC1 of the first pressure adjusting valve 122 and the two high and low pulley control hydraulic pressures PH, PL is as shown in FIG. 3.

Figure 4:
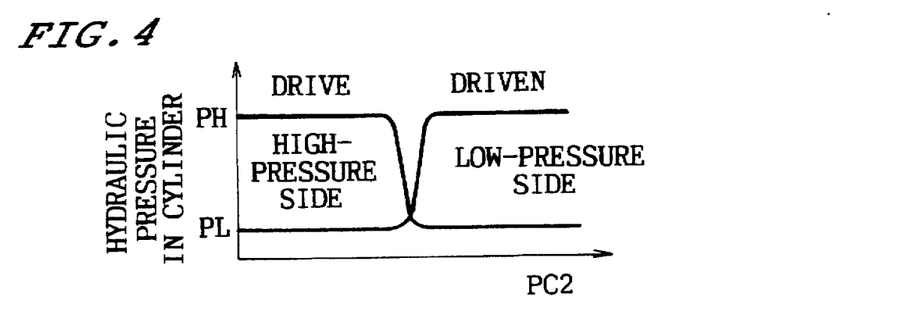
FIG. 4 is a graph showing the change in hydraulic pressure in a cylinder chamber of each of the pulleys corresponding to the speed change control.

The shift valve 130 is movable between the following two positions, i.e., a left position in which the high pulley control hydraulic pressure PH is supplied to the cylinder chamber 30c of the drive pulley 30 and the low pulley control hydraulic pressure PL is supplied to the cylinder chamber 31c of the driven pulley 31 to thereby change the speed reduction ratio (input/output) of the V-belt mechanism 3 towards the side of minimizing or decreasing it (i.e., to a high-speed side), and a right position in which the high pulley control hydraulic pressure PH is supplied to the cylinder chamber 31c of the driven pulley 31 and the low pulley control hydraulic pressure PL is supplied to the cylinder chamber 30c of the drive pulley 30 to thereby change the speed reduction ratio of the V-belt mechanism 3 towards the side of maximizing or increasing it (i.e., to a low-speed side). The shift valve 130 is urged or pushed to the left by a spring 130a on the right end thereof and is also pushed to the right by the output hydraulic pressure PC2 of the second pressure adjusting valve 131 which is inputted to a left end oil chamber 130b via an oil passage L9. Depending on this output hydraulic pressure PC2 the hydraulic pressure in the cylinder chambers 30a, 31a of both the pulleys 30, 31 is controlled as shown in FIG. 4 to thereby control the speed reduction ratio of the V-belt mechanism 3.

As described above, this output hydraulic pressure PC2 is variably controlled depending on the exciting electric current value to the solenoid 131a of the second pressure adjusting valve 131. Therefore, it follows that the speed reduction ratio of the V-belt mechanism 3 is controlled by controlling the exciting electric current Value by means of the controller 15. Explanation will now be made about this speed-change control.

Figure 6A:
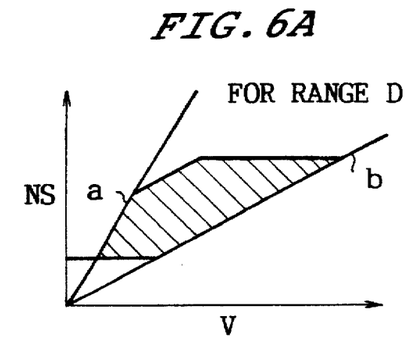
FIGS. 6A and 6B are graphs showing set maps of target revolution speed NS.
Figure 6B:
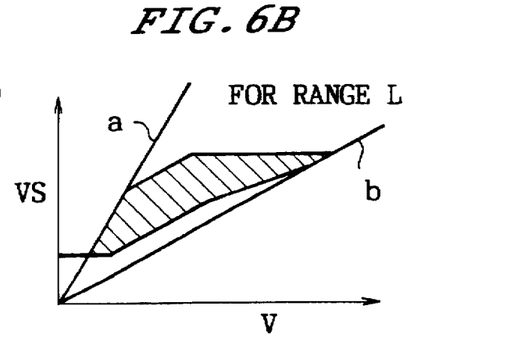

The control of the speed reduction ratio is performed basically by setting a target revolution speed NS of the engine ENG based on the vehicle speed V and the engine load (e.g., throttle opening degree of the engine) and by changing the speed reduction ratio so that the revolution speed Ne of the engine becomes NS. The correlation of the target revolution speed NS to the vehicle speed V and to the engine load is mapped for storing inside the controller 15. However, since the correlation required when a shift range of an automatic speed-change range D is selected and the correlation required when a low-speed holding range L is selected is different from each other, there are prepared an NS map for D-range as shown in FIG. 6A and an NS map for the L-range as shown in FIG. 6B. In FIGS. 6A and 6B line "a" and line "b" show the relationship between the vehicle speed V and the revolution speed Ne of the engine at maximum and minimum speed reduction ratios, respectively. The NS is so set as to increase with the increase in the engine load in a hatched region between the lines "a" and "b."

When the NS has exceeded an upper limit value Nmax, the NS is arranged to be set again to Nmax. Further, there are set a maximum value NmaxH (e.g., 6800 rpm) and a minimum value NminL of Nmax, and a correction range at the time of correction to increase or correction to decrease the Nmax as described hereinafter is limited between NmaxH and NmaxL.

In addition, there are set a first set revolution speed NH and a first set time TMH which serve as a basis for judgement of rise in the hydraulic oil temperature in the transmission. There are also set a second set revolution speed NL and a second set time TML which serve as a basis for judgement of lowering in the hydraulic oil temperature in the transmission. These first and second set revolution speeds NH, NL and the first and second set times TMH, TML are variably set depending on the ambient temperature TA according to the tables shown in FIGS. 7A, 7B and 8A, 8B. Concrete figures of NH, NL, TMH, TML are given as examples in the following table.

|  | TA (°C.) | | |
| --- | --- | --- | --- |
|  | 10 | 30 | 40 |
| NH (rpm) | 6000 | 5000 | 4000 |
| NL (rpm) | 5000 | 4000 | 3000 |
| TMH (min) | 60 | 10 | 5 |
| TML (min) | 5 | 10 | 20 |

Figure 5:
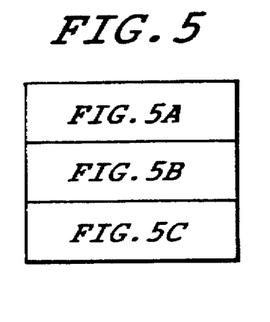
FIG. 5, which is divided into details of FIGS. 5A through 5C, is a flow chart showing an example of the speed change control according to the present invention.
Figure 5A:
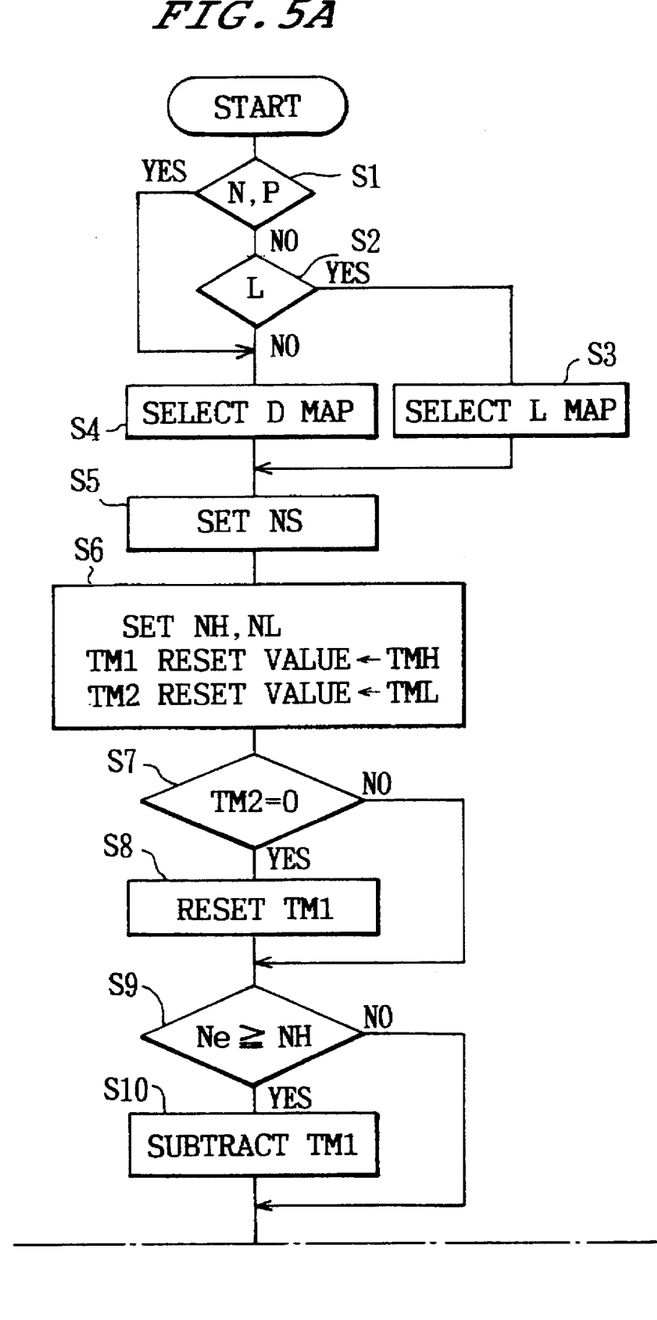
Figure 5B:
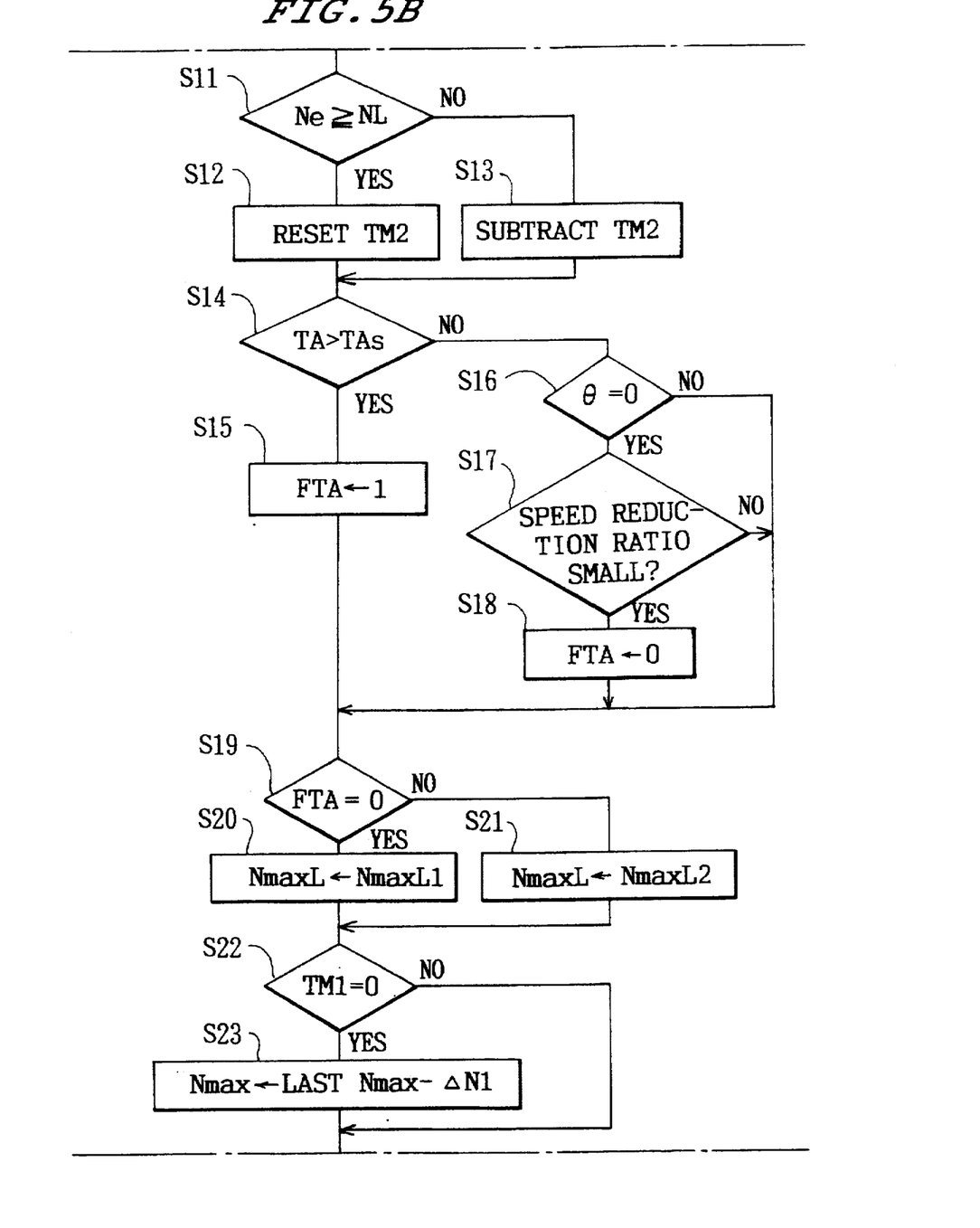
Figure 5C:
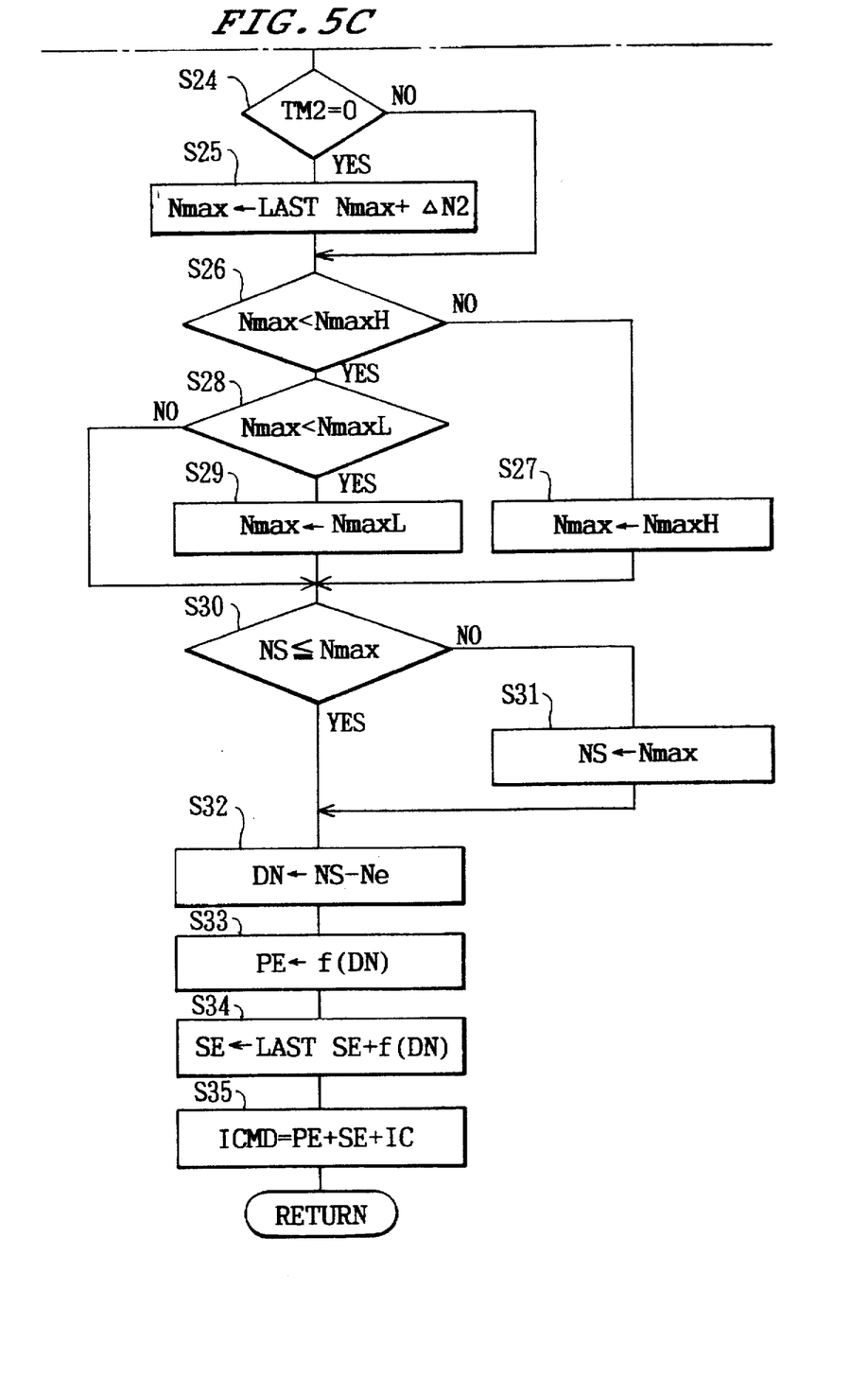

The program of the speed-change control is as shown in FIG. 5 which are divided into details of FIGS. 5A through 5C. First, a determination is made as to whether the present shift range is in neutral range N or in parking range P (S1). If it is not in N or P, a determination is made as to whether it is in low-speed holding range L (S2). If it is in range L, the NS map for range L as shown in FIG. 6B is selected (S3). If it is in N or P and is not in L, i.e., if the shift range is in automatic speed-change range D, the NS map for range D as shown in FIG. 6A is selected (S4). Then, a target revolution speed NS corresponding to the present vehicle speed V and the present engine load is searched in the selected NS map (S5).

Figure 7A:
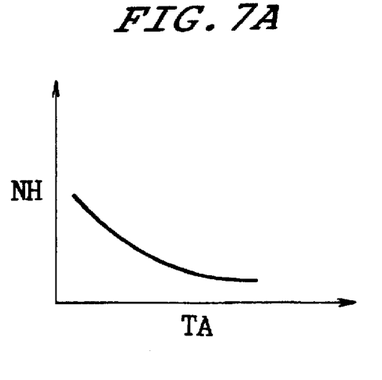
FIGS. 7A and 7B are graphs showing set tables of first and second set revolution speeds NH and NL, respectively.
Figure 7B:
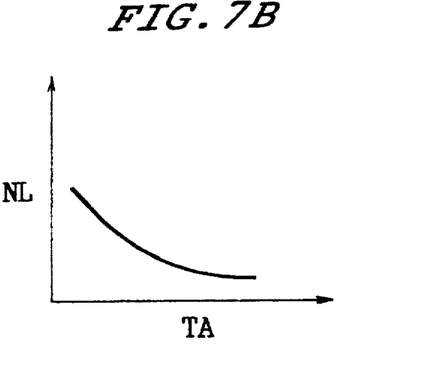
Figure 8A:
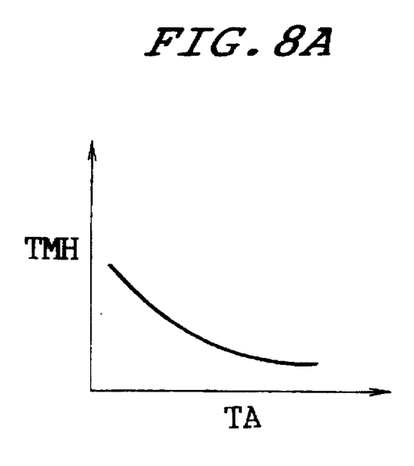
FIGS. 8A and 8B are graphs showing set tables of first and second set times TMH and TML, respectively.
Figure 8B:
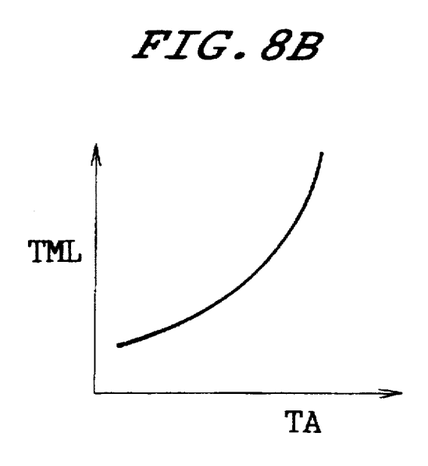

Thereafter, NH and NL are set to values corresponding to the ambient temperature by searching the tables in FIGS. 7A and 7B. Also, the reset value of a first timer in the subtraction formula for TMH and the set value of a second timer in the subtraction formula for TML are set to values TMH, TML corresponding to the ambient temperature TA by searching the tables in FIGS. 8A, 8B.

Then, a determination is made as to whether the remaining time TM2 of the second timer becomes zero (S7). If TM2=0, the remaining time TM1 of the first timer is reset to TMH (S8). If TM2≠0, the program proceeds to step S9 without resetting TM1, and determines whether the revolution speed Ne of the engine is equal to or above NH (S9). If Ne≧NH, the remaining time TM1 of the first timer is subtracted (S10). If Ne<NH, the program proceeds to step S11 without subtracting TM1, and determines whether the revolution speed Ne of the engine is equal to or above NL (S11). If Ne≧NL, the remaining time TM2 of the second timer is reset to TML (S12). If Ne< NL, the remaining time TM2 is subtracted (S13) and the program proceeds to step S14.

At step S14 a determination is made as to whether the ambient temperature TA is above a predetermined value TAs (e.g., 30° C.). If TA>TAs, an ambient temperature flag FTA is set to 1 (S15). If TA≦TAs, determinations are made as to whether the throttle opening degree θ is fully closed or not and as to whether the speed reduction ratio is small (i.e., high-speed side) (S16, S17). If θ=0 and also if the speed reduction ratio is small, the ambient temperature flag FTA is reset to zero (S18). If θ≠0, or if the speed reduction ratio is not small, the ambient temperature flag FTA is not reset but the program proceeds to step S19 and determines whether the ambient temperature flag FTA is zero. If FTA=0, the minimum value NmaxL of the upper limit value Nmax is set to a relatively high predetermined value NmaxL1 (e.g., 6500 rpm) (S20). If FTA≠0, NmaxL is set to a relatively low predetermined value NmaxL2 (e.g., 4500 rpm) (S21). It may also be considered to reset the ambient temperature flag FTA to zero when TA≦TAs. However, during a high-load operation or under a condition in which the speed reduction ratio is small and the revolution speed Ne of the engine increases, the thermal load becomes large and the hydraulic oil temperature is likely to increase. Therefore, it has been so arranged, as described above, that the ambient temperature flag FTA is reset to zero only when the following three conditions of TA≦TAs, θ=0, and the speed reduction ratio is small are met, thereby setting NmaxL high.

Once NmaxL has been set, a determination is then made as to whether the remaining time TM1 of the first timer has become zero (S22). It is when an accumulated time of high-speed operation in which Ne≧NH has exceeded TMH that the condition of TM1=0 is met. At this time, the upper limit value Nmax is corrected to decrease by a predetermined amount ΔN1 from the last upper limit value Nmax (S23). Then, the upper limit value Nmax is reduced stepwise with an increase in the accumulated time of the high-speed operation. By the way, ΔN1 is set such that the speed of decrease in Nmax becomes 25 rpm/sec, for example.

Thereafter, the program proceeds to step S24 and determines whether the remaining time of the second timer TM2 has become zero. If TM1≠0, the program proceeds to S24 without correcting to decrease Nmax. Since TM2 is reset to TML at step S12 when a condition of Ne≧NL is met, it is when the duration time TM of low-speed operation under Ne<NL exceeds TML that the condition of TM2=0 is satisfied. At this time the upper limit value Nmax is corrected by increasing the upper limit value Nmax by a predetermined amount ΔN2 from the last upper limit value Nmax (S25). Then, the upper limit value Nmax is increased stepwise with the increase in the duration time of low-speed operation. By the way, ΔN2 is so set that the speed of increase in Nmax becomes 300 rpm/sec, for example, and Nmax is thus corrected to increase at a speed higher than the decreasing speed due to correction to decrease.

Thereafter, the program proceeds to step S26 and determines whether the upper limit value Nmax is below NmaxH. If TM2≠0, the program proceeds to step S26 without correcting to increase Nmax. If Nmax≧NmaxH, Nmax is set again to NmaxH (S27). If Nmax<NmaxH, a determination is made as to whether Nmax is below NmaxL (S28). If Nmax<NmaxL, Nmax is set again to NmaxL (S29). If Nmax≧NmaxL, the program proceeds to step S30 without setting Nmax again.

At step S30, a determination is made as to whether the target revolution speed NS that was set at step S5 is equal to or below Nmax. If NS>Nmax, Ns is set again to Nmax (S31). If NS≦Nmax, the program proceeds to step S32 without setting NS again and obtain a difference DN between the NS and the present revolution speed Ne of the engine (the revolution speed of the drive pulley 30 will do as well).

Thereafter, a correction value PE of a proportional term in a feedback control formula necessary to change the speed reduction ratio so as to coincide the revolution speed Ne of the engine with the target revolution speed NS is computed as a function of DN (S33). Then, a correction value SE of a differential term in the feedback control formula is computed as a function of DN (S34). A command value ICMD for the exciting electric current to the solenoid 131a of the second pressure adjusting valve 131 is obtained by adding PE, SE and a reference electric current value IC (S35). The solenoid 131a is excited or charged with the electric current value of ICMD to control the speed reduction gear ratio, thereby making Ne=NS.

According to the above-described control, when the accumulated time of the high-speed operation under condition of Ne≧NH is above TMH and consequently the hydraulic oil temperature of the transmission is on the increasing hand, Nmax is corrected to decrease. Therefore, even if NS is set to Nmax with a consequent increase of Ne to Nmax, there is no possibility that the hydraulic oil temperature abnormally increases. Further, when the duration time of the low-speed operation under condition of Ne<NL exceeds TML and consequently the hydraulic oil temperature sufficiently lowers, Nmax is corrected to increase. Therefore, there is no deterioration in drivability. By the way, when the duration time of the low-speed operation exceeds TML, the remaining time TM1 of the first timer is reset to TMH. Therefore, Nmax is not corrected to decrease until the accumulated time of the high-speed operation becomes above TMH again.

Further, in a condition in which the ambient temperature TA is high and the thermal load becomes high, NH is set low and TMH is set short with the result that Nmax is corrected to decrease at an early time and, further, NL is set low and TML is set long with the result that the frequency of correction to increase Nmax becomes small. Therefore, an abnormal increase in the hydraulic oil temperature at a high ambient temperature can be surely prevented. In addition, since the minimum value NmaxL of Nmax is set low when the ambient temperature AT is high, Nmax will be reduced to a relatively low value by an increase of the time in the high-speed operation under condition of a high ambient temperature. The rise in the hydraulic oil temperature under condition of a high ambient temperature can therefore be effectively prevented.

Figure 9:
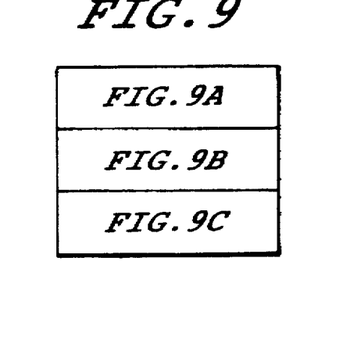
FIG. 9, which is divided into details of FIGS. 9A through 9C, is a flow chart showing another example of the speed change control according to the present invention.

An explanation has so far been made about an embodiment in which the upper limit value Nmax is corrected. It is of course possible to prevent the rise in the hydraulic oil temperature by correcting the target revolution speed NS. Such an embodiment will now be explained with reference to FIG. 9 which are divided into details of FIG. 9A through 9C.

Figure 9A:
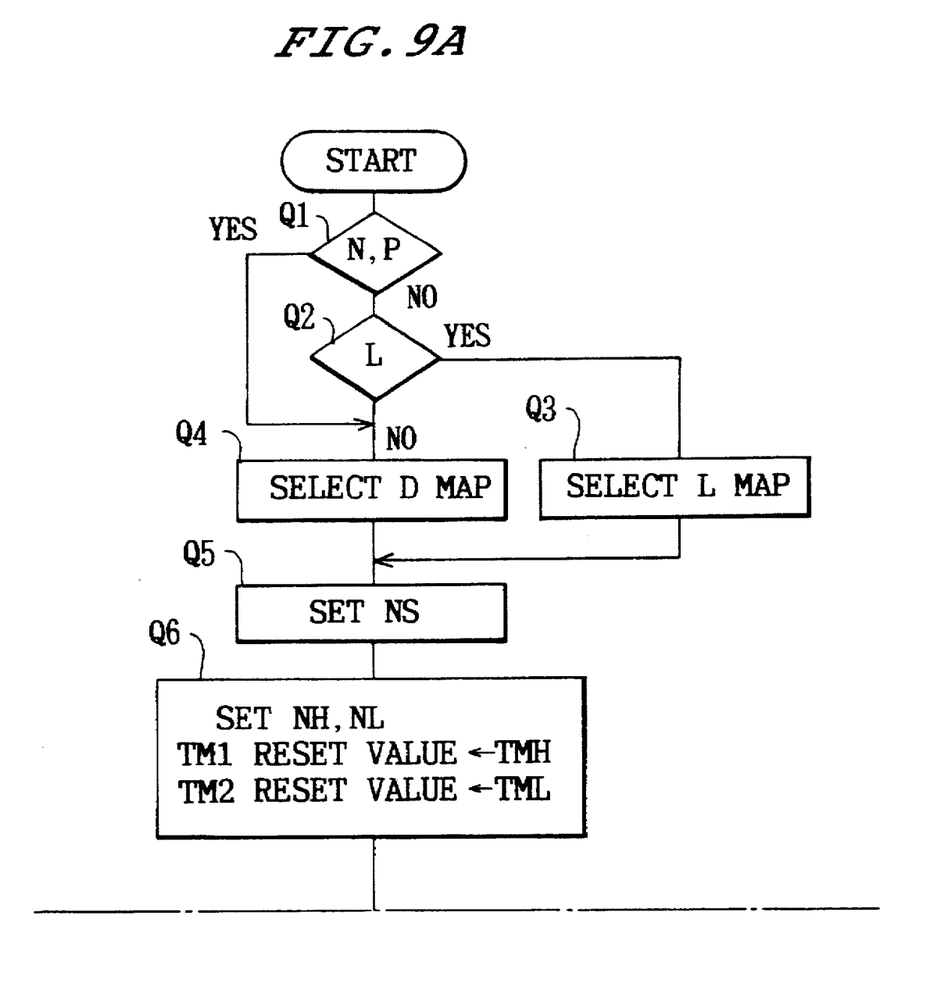
Figure 9B:
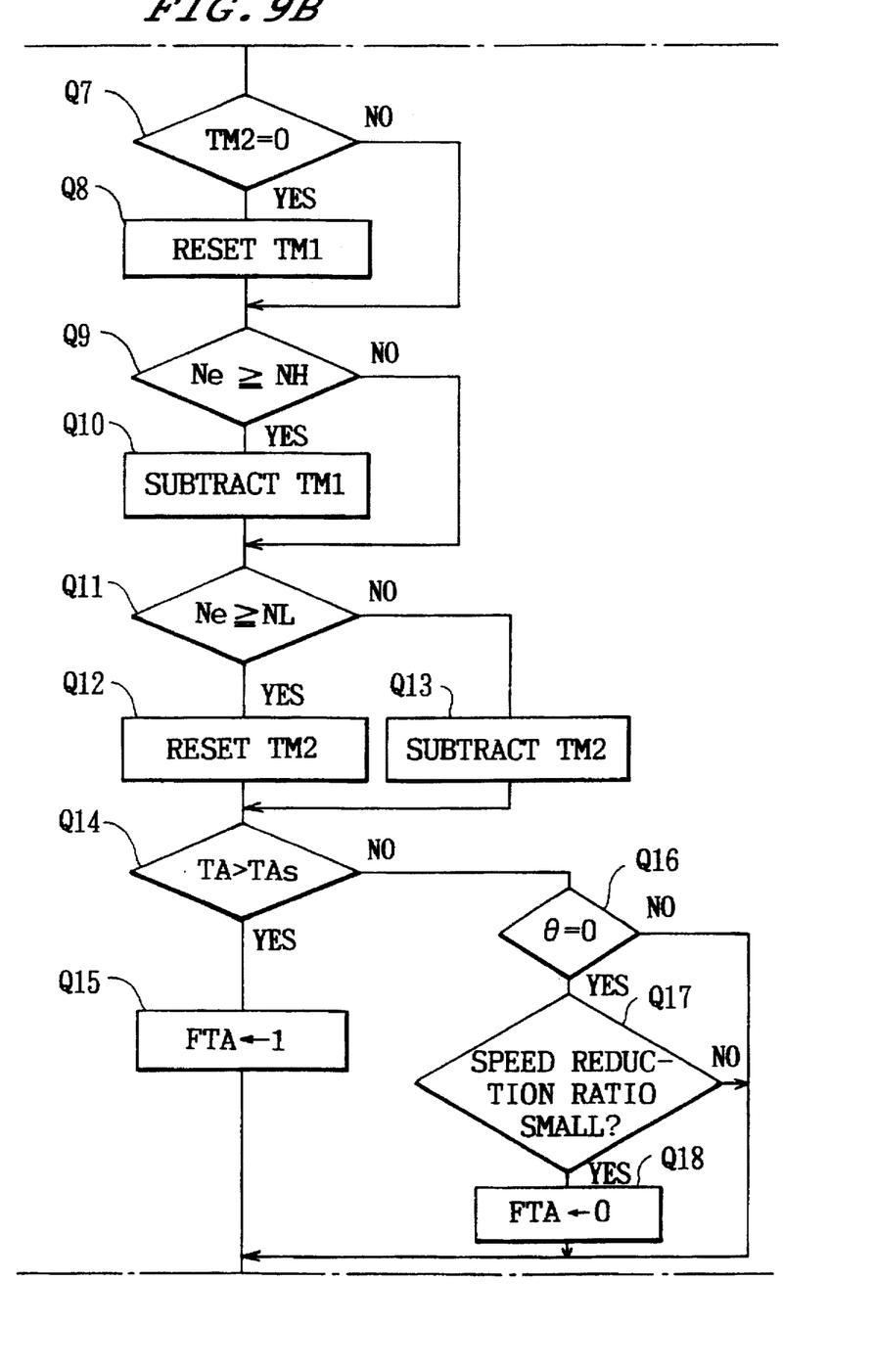

In FIGS. 9A and 9B the steps Q1 through Q18 are the same as the steps S1 through S18 in FIGS. 5A and 5B. Their explanation is therefore omitted. In the embodiment shown in FIG. 5, a determination is made at step S19, which is next to step S18, as to whether FTA=0. In the embodiment shown in FIG. 9A through 9C, on the other hand, a determination is made at step Q19, which is next to step Q18, as to whether TM1=0.

If TM1=0, the correction flag FN is set to 1 (Q20). If TM1≠0, the program proceeds to step Q21 without setting FN to 1 and a defemination is made as to whether TM2=0. If TM2=0, the correction flag FN is reset to zero (Q22). If TM2≠0, the program proceeds to step Q23 without resetting FN to zero and a defemination is made as to whether FN=1.

Figure 9C:
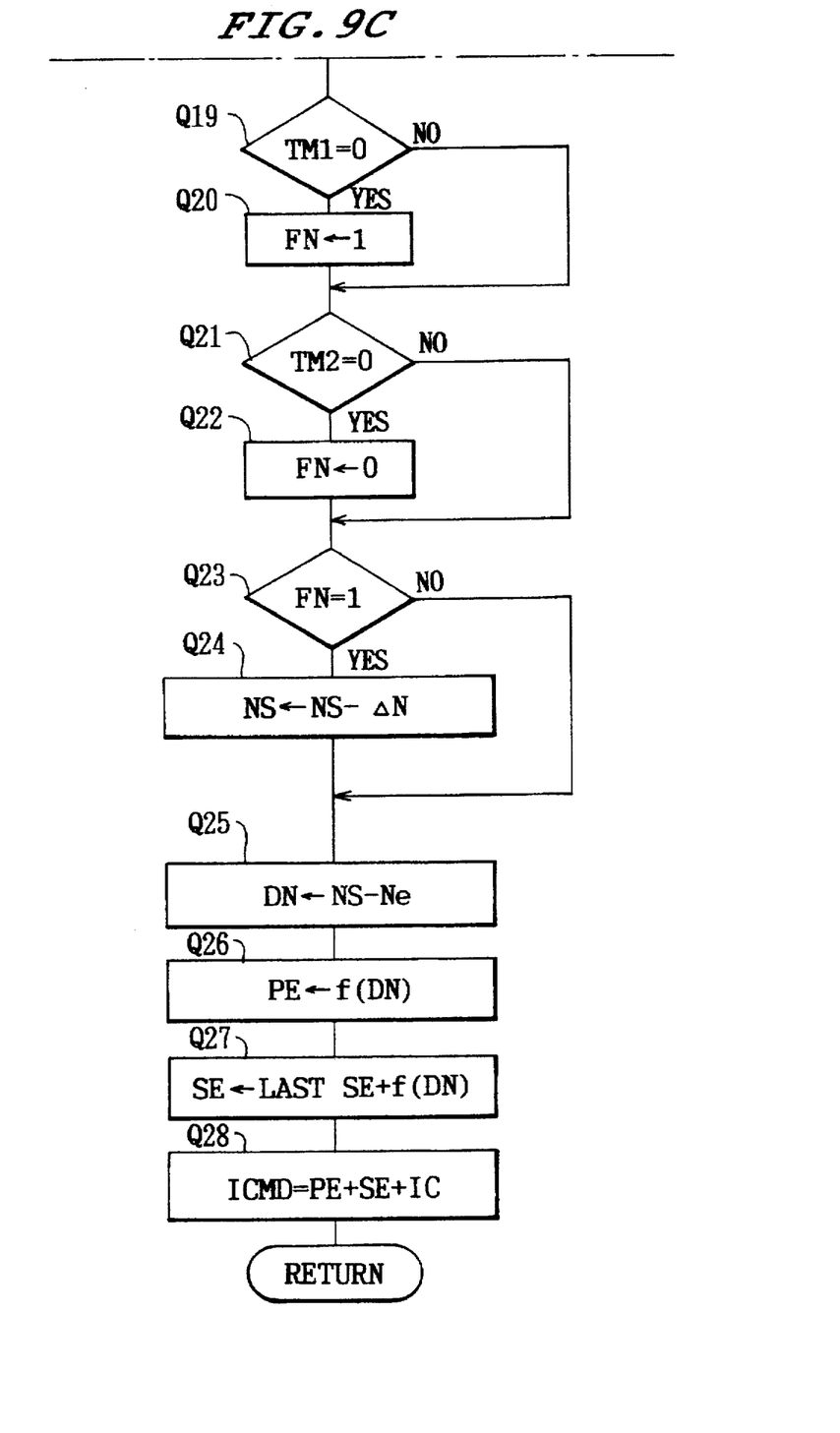
Figure 10:
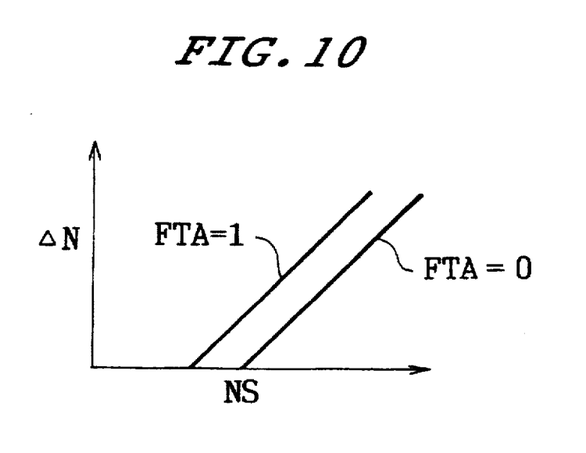
FIG. 10 is a graph showing a set table of correction amount ΔN.

It is when the accumulated time of the high-speed operation above NH is above TMH and the hydraulic oil temperature is on the increasing hand that the condition of FN=1 is met. At such a time the program proceeds to step Q24 to correct to decrease the target revolution speed NS and proceeds to step Q25. The amount ΔN of correction to decrease at step Q24 is arranged to be variably set depending on NS. The correlation between ΔN and NS is stored in the controller 15 as a table shown in FIG. 10. This correlation is different between the high-temperature time when the ambient temperature flag FTA becomes 1 and the low-temperature time when FTA becomes zero. Depending on the correlation corresponding to the values of FTA to be set at steps Q15 and Q18, ΔN is obtained and NS is set again to a value in which ΔN is subtracted therefrom. By the way, ΔN is so set as to increase depending on the increase in NS when NS exceeds a predetermined value. If FN=0, the program proceeds to step Q25 without correcting NS.

The steps after step Q25 are the same as the steps S32 and downwards in FIG. 5C, and the speed reduction ratio is controlled so that Ne coincides with NS. In this manner, the increase in Ne at the time when the hydraulic oil temperature is on the increasing hand is restrained by the correction to decrease of NS, thereby preventing an abnormal increase in the hydraulic oil temperature. In addition, if the duration time of the operation at low revolution speed in a condition of Ne<NL exceeds TML, the correction to decrease NS is stopped. Therefore, the deterioration in drivability does not occur.

As can be seen from the above description, according to the present invention, an abnormal increase in the hydraulic oil temperature can be prevented without using hydraulic oil temperature sensors. It has therefore an advantage in that the cost can be reduced and an abnormal increase in the hydraulic oil temperature through failure of the sensors does not occur, resulting in a higher reliability.

It is readily apparent that the above-described control apparatus for a continuously variable vehicular transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a continuously variable vehicular transmission for continuously varying a speed reduction ratio depending on a running condition of a vehicle, having:
    means for setting a target revolution speed of an engine based on a vehicle speed and an engine load; and
    means for controlling the speed reduction ratio such that the revolution speed of the engine becomes the target revolution speed;
    wherein the improvement comprising:
        upper limit setting means for setting the target revolution speed to an upper limit value when the target revolution speed exceeds the upper limit value;
        first time measuring means for measuring an accumulated time when the revolution speed of the engine exceeds a first set revolution speed which is lower than the upper limit value; and
        first correction means for correcting to decrease the upper limit value when the accumulated time has exceeded a first set time.

2. A control apparatus according to claim 1, further comprising:
    second time measuring means for measuring between a time when the revolution speed of the engine lowers below a second set revolution speed which is smaller than the first set revolution speed and a time when it exceeds the second set revolution speed; and
    second correction means for correcting to increase the upper limit value when the time measured by the second time measuring means exceeds a second set time.

3. A control apparatus according to claim 1, wherein a minimum value of the upper limit value to be corrected by the first correction means is variably set depending on an ambient temperature.

4. A control apparatus according to claim 2, wherein a minimum value of the upper limit value to be corrected by the first correction means is variably set depending on an ambient temperature.

5. A control apparatus for a continuously variable vehicular transmission for continuously varying a speed reduction ratio depending on a running condition of a vehicle, having:
    means for setting a target revolution speed of an engine based on a vehicle speed and an engine load; and
    means for controlling the speed reduction ratio such that the revolution speed of the engine becomes the target revolution speed;
    wherein the improvement comprising:
        first time measuring means for measuring an accumulated time when the revolution speed of the engine exceeds a first set revolution speed; and
        correction means for correcting to decrease the target revolution speed when the accumulated time exceeds a first set time.

6. A control apparatus according to claim 5, further comprising:
    second time measuring means for measuring between a time when the revolution speed of the engine lowers below a second set revolution speed which is smaller than the first set revolution speed and a time when it exceeds the second set revolution speed; and
    stopping means for stopping the correction by the correction means when the time measured by the second time measuring means exceeds a second set time.

7. A control apparatus according to claim 5, wherein an amount of correction by the correction means is variably set depending on the target revolution speed.

8. A control apparatus according to claim 6, wherein an amount of correction by the correction means is variably set depending on the target revolution speed.

9. A control apparatus according to claim 1 or 5, wherein at least one of the first set time and the first set revolution speed is variably set depending on the ambient temperature.

10. A control apparatus according to any one of claims 2, 3, 4, 6, 7 and 8, wherein at least one of the first set time, the second set time, the first set revolution speed and the second set revolution speed is variably set depending on the ambient temperature.

* * * * *